US010865736B2

(12) United States Patent
Wadsworth et al.

(10) Patent No.: US 10,865,736 B2
(45) Date of Patent: Dec. 15, 2020

(54) CASCADE SEGMENT FOR THRUST REVERSER WITH REPEATING MODULAR UNITS, AND METHOD OF MANUFACTURING SAME

(71) Applicant: SPIRIT AEROSYSTEMS, INC., Wichita, KS (US)

(72) Inventors: Mark Anthony Wadsworth, Sedan, KS (US); Alexander Jon Carr, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 203 days.

(21) Appl. No.: 16/156,547

(22) Filed: Oct. 10, 2018

(65) Prior Publication Data

US 2019/0113001 A1    Apr. 18, 2019

Related U.S. Application Data

(60) Provisional application No. 62/573,866, filed on Oct. 18, 2017.

(51) Int. Cl.
*F02K 1/64* (2006.01)
*F02K 1/72* (2006.01)
*F01D 25/28* (2006.01)

(52) U.S. Cl.
CPC .............. *F02K 1/64* (2013.01); *F01D 25/28* (2013.01); *F01D 25/285* (2013.01); *F02K 1/72* (2013.01); *F05D 2230/60* (2013.01); *F05D 2240/129* (2013.01)

(58) Field of Classification Search
CPC ... F02K 1/64; F02K 1/62; F02K 1/625; F02K 1/70; F02K 1/72; F05D 2240/129
See application file for complete search history.

(56) References Cited

U.S. PATENT DOCUMENTS

| 4,852,805 A | * | 8/1989 | Vermilye | .......... B29C 45/14631 239/265.11 |
| 2004/0088858 A1 | * | 5/2004 | Holme | ...................... F02K 1/54 29/889.22 |
| 2006/0005530 A1 | * | 1/2006 | Blin | ........................ F02K 1/72 60/226.2 |

(Continued)

FOREIGN PATENT DOCUMENTS

FR          2947869       *  1/2011  ............... F02K 1/72

*Primary Examiner* — Andrew H Nguyen
(74) *Attorney, Agent, or Firm* — Hovey Williams LLP

(57) ABSTRACT

A cascade segment for a thrust reverser, and a method of manufacturing it. The segment includes individual vane elements, modular units, and a frame. Each element includes a vane and two flanges arranged in a generally "U" shape. Each flange diverges from being perpendicular to the vane by an amount equal to a thickness of the flange over a desired spacing distance, such that when one element is inserted into another the desired spacing distance is established between their respective vanes. The units include first modular units, each of which includes a first column of the elements oriented in a first direction, and second modular units, each of which includes a second column of the elements oriented in a second direction. In the assembled segment, the first units are positioned adjacent to and alternating with the second units. The frame extends at least partly around and secures the units.

20 Claims, 19 Drawing Sheets

(56) References Cited

U.S. PATENT DOCUMENTS

2016/0186689 A1* 6/2016 Bartel .................. B29C 33/485
                                                     239/265.19
2018/0340492 A1* 11/2018 Harpal .................... F02K 1/72

* cited by examiner

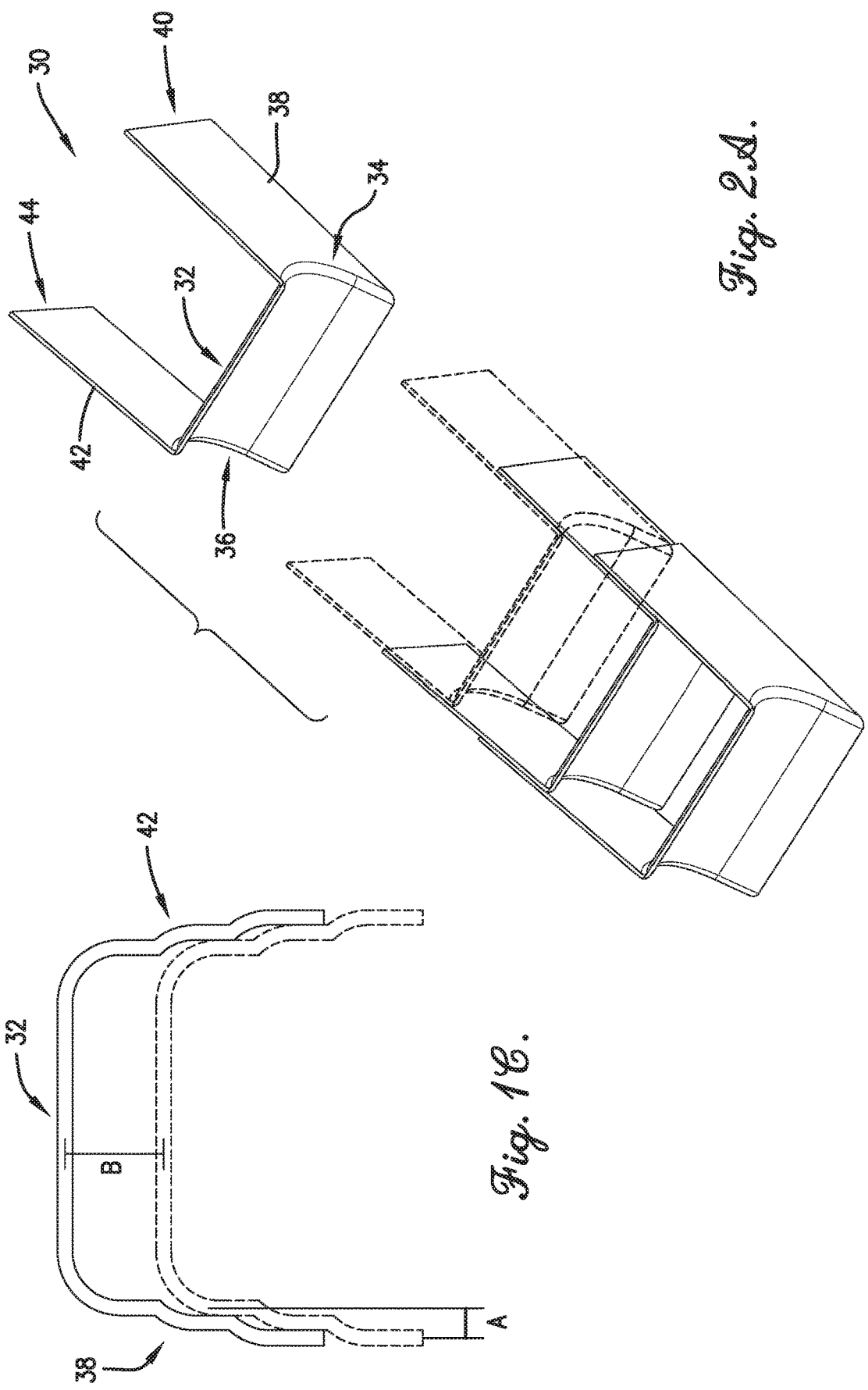

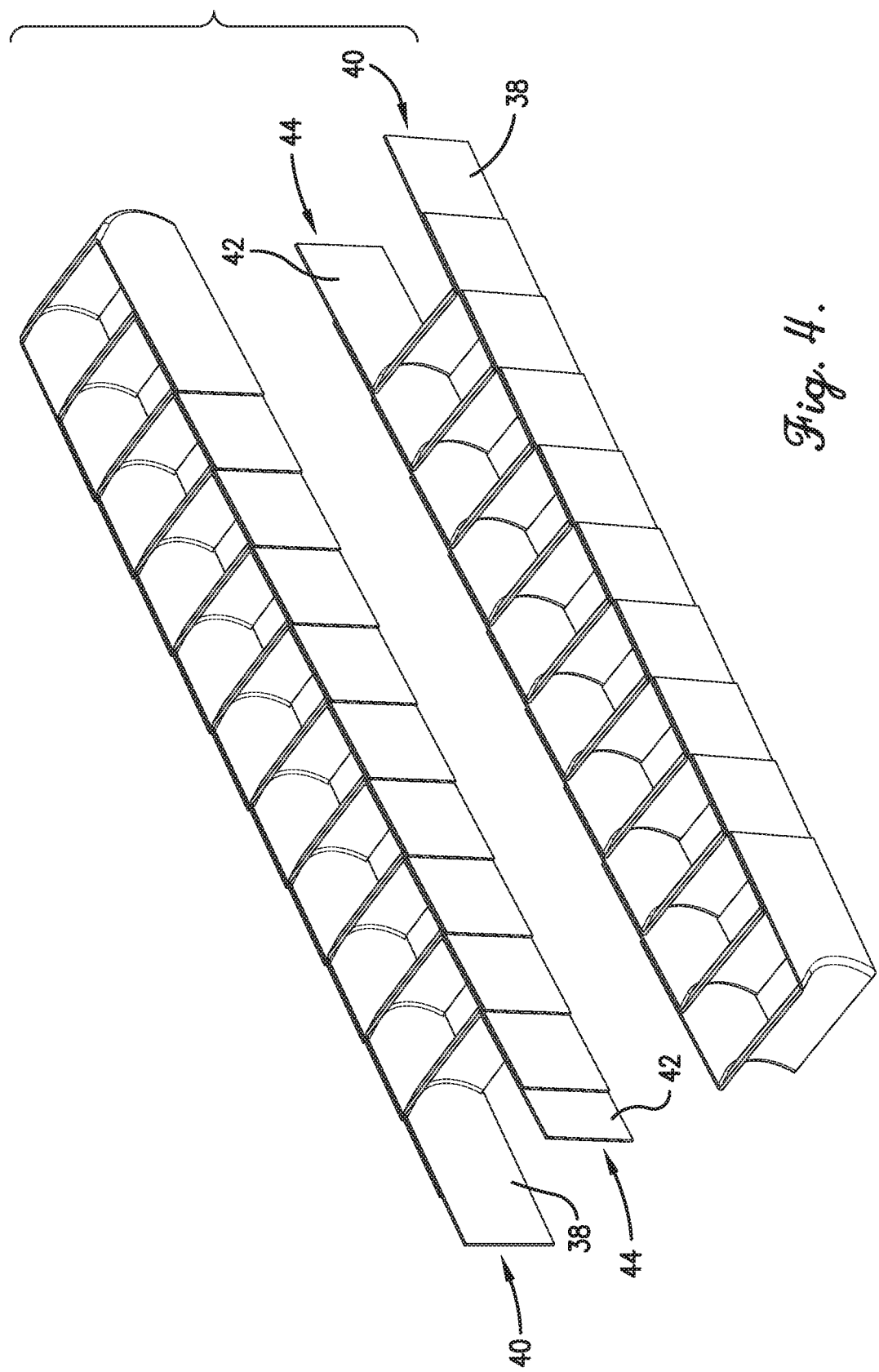

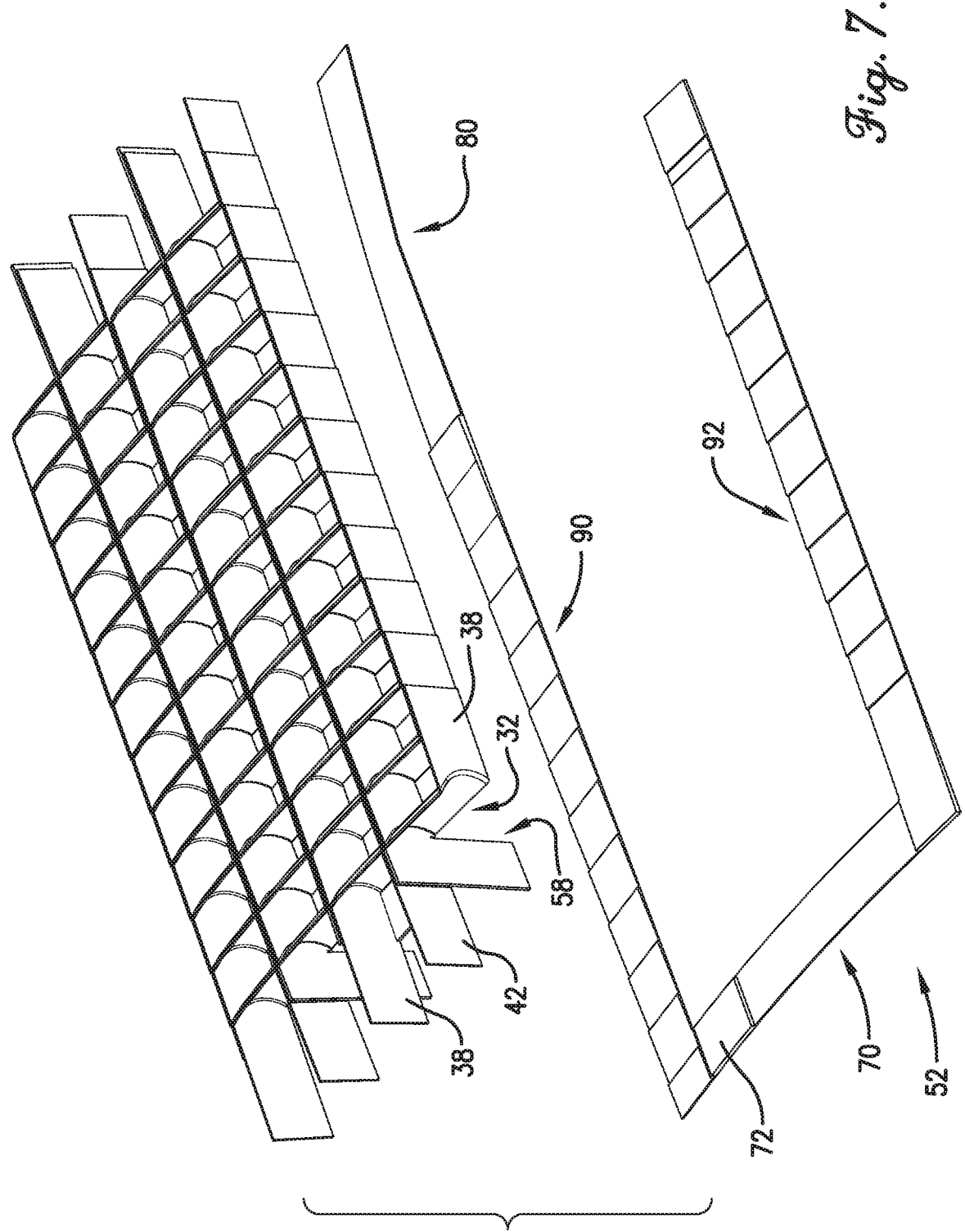

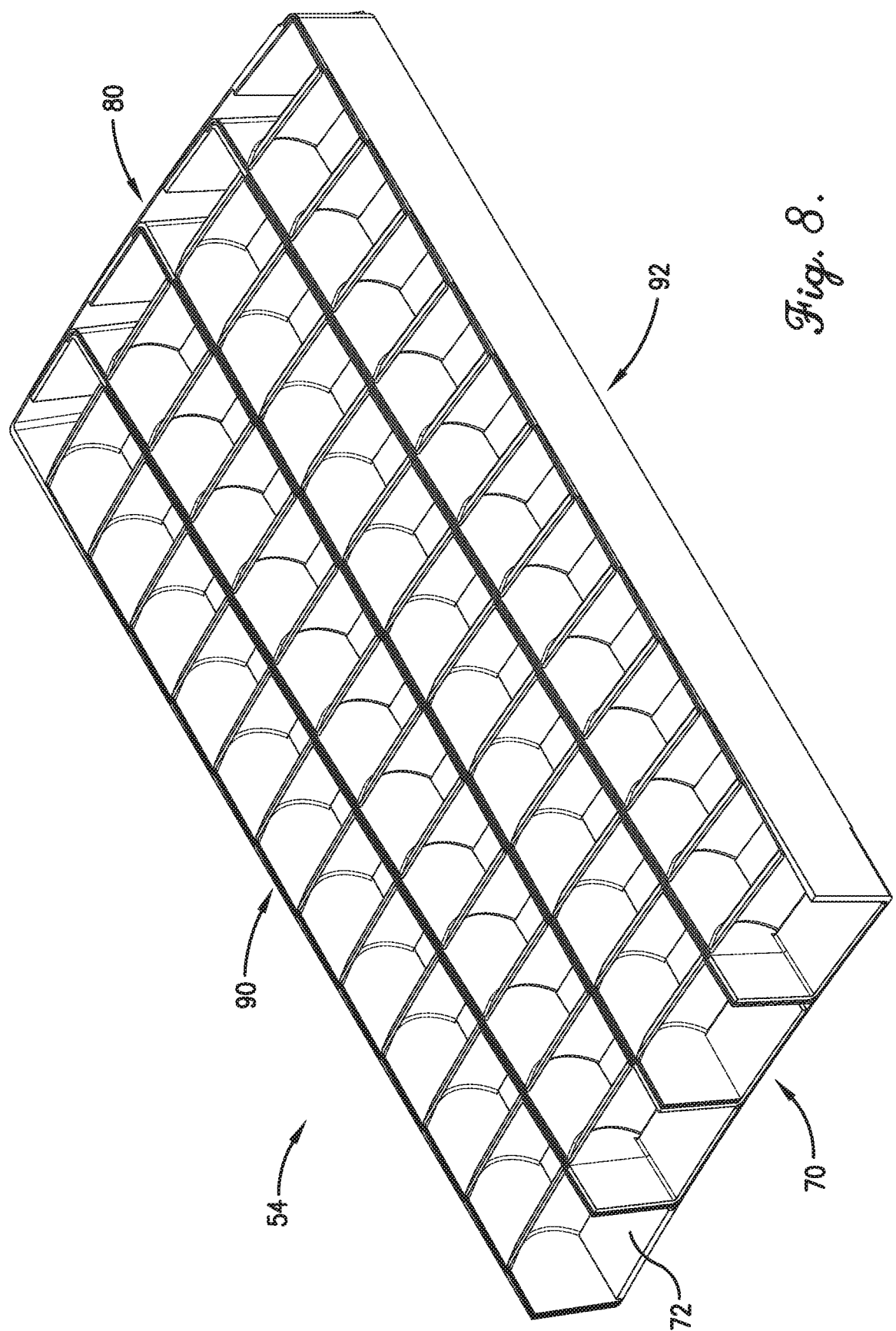

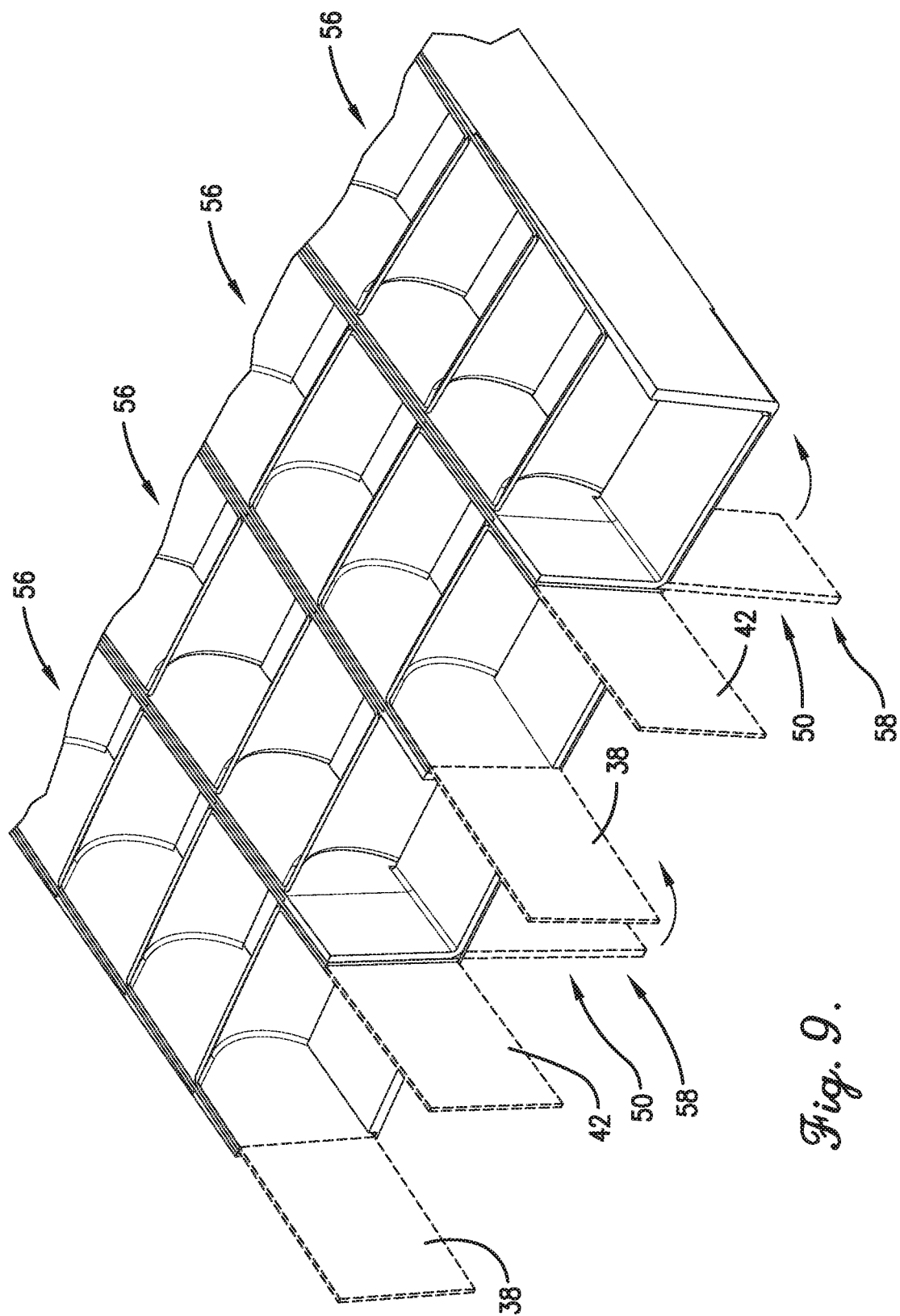

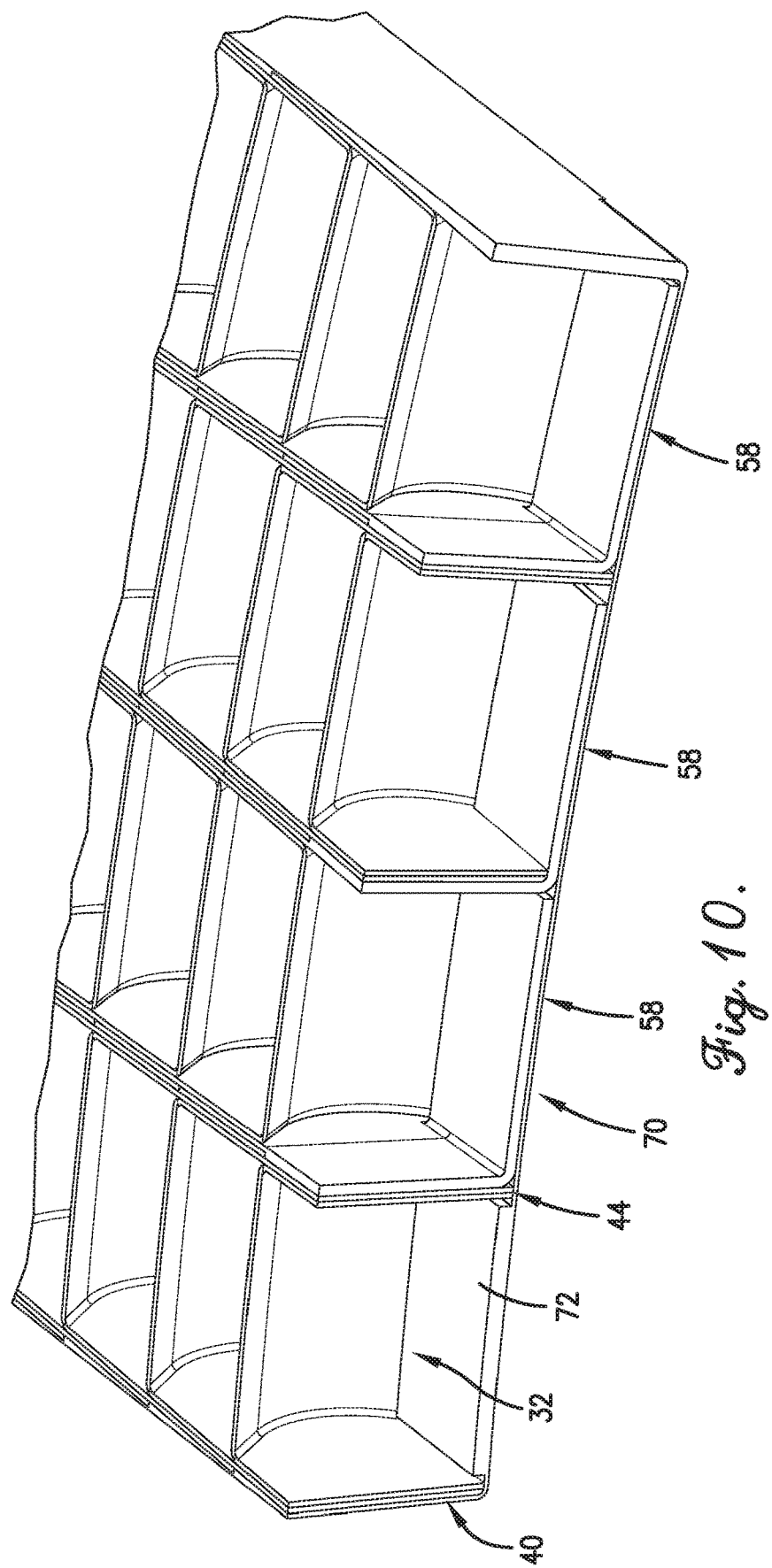

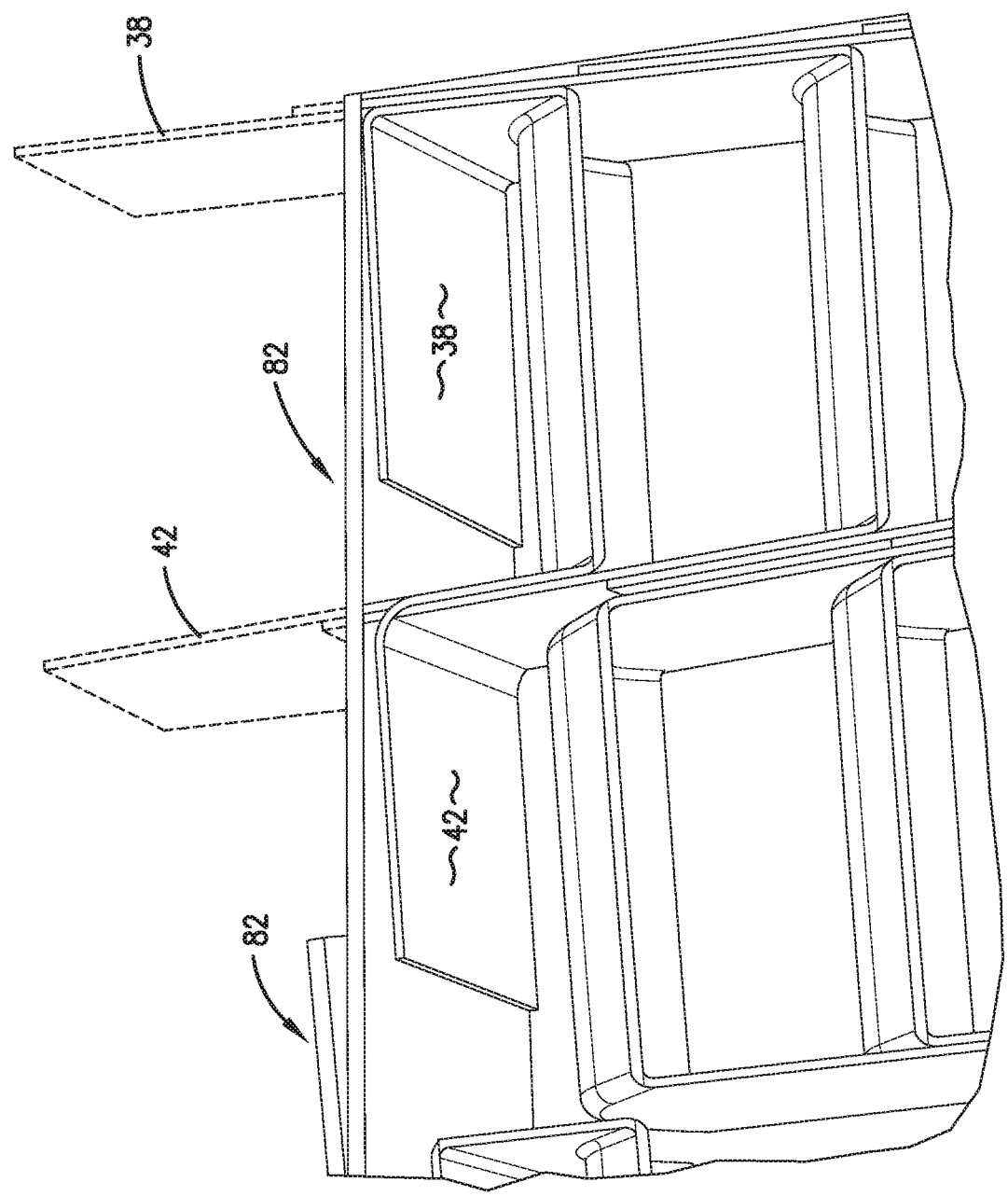

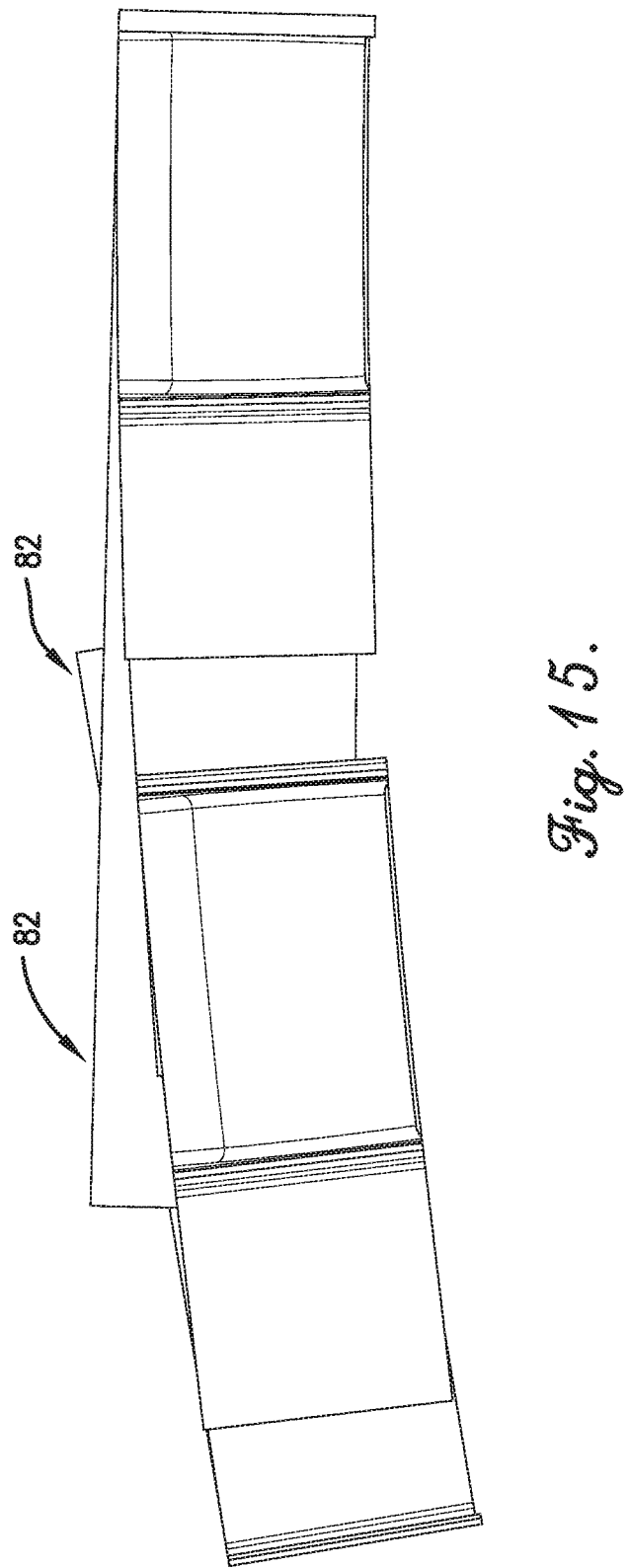

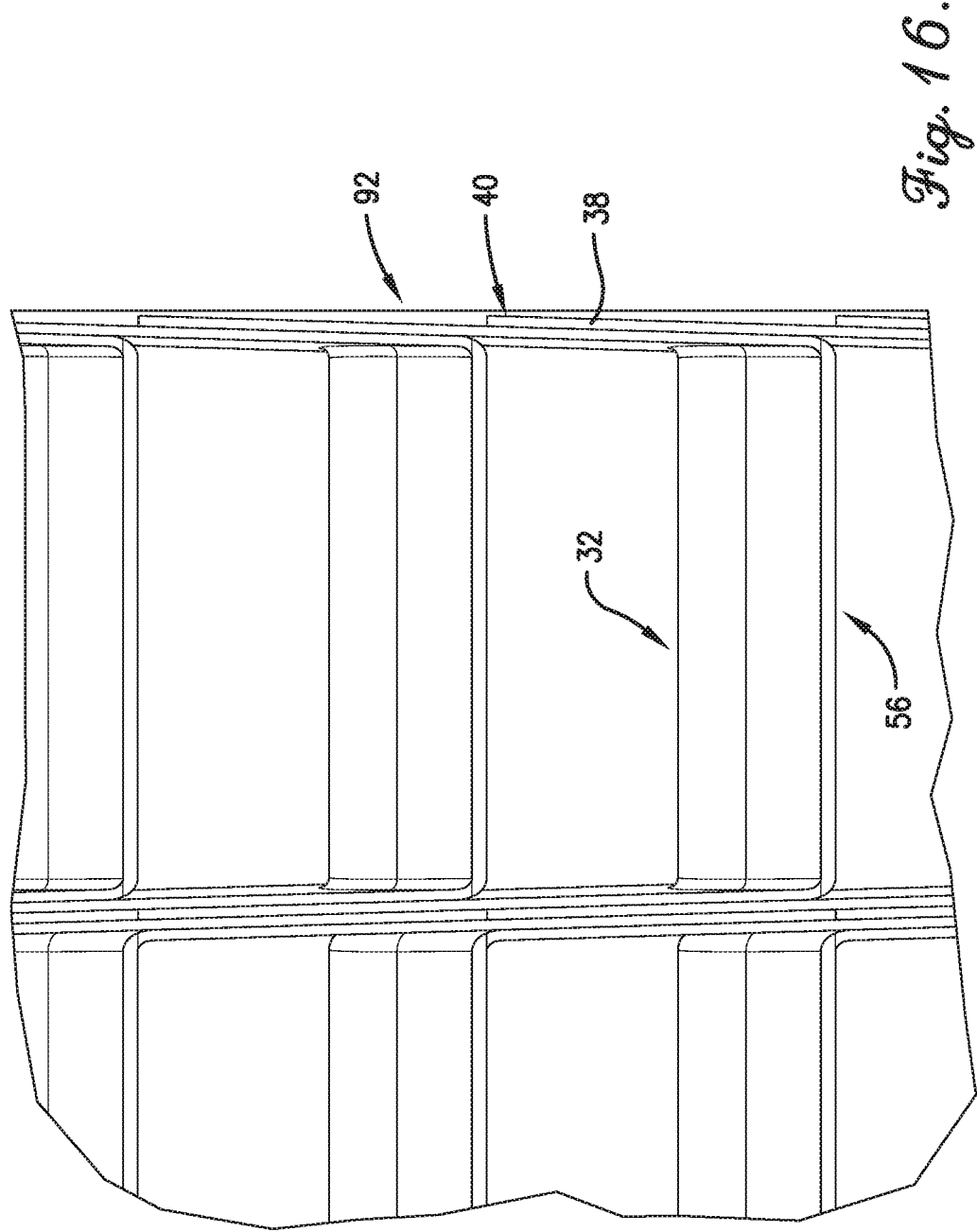

CASCADE SEGMENT FOR THRUST REVERSER WITH REPEATING MODULAR UNITS, AND METHOD OF MANUFACTURING SAME

RELATED APPLICATIONS

The present U.S. non-provisional patent application is related to and claims priority benefit of a prior-filed U.S. provisional patent application having the same title, Ser. No. 62/573,866, filed Oct. 18, 2017. The entire content of the identified prior-filed patent application is hereby incorporated by reference into the present patent application as if fully set forth herein.

FIELD

The present invention relates to cascade thrust reversers and methods of manufacturing them, and more particularly, embodiments concern a cascade segment for a thrust reverser having a plurality of individual vane elements assembled into repeating modular units, and a method of manufacturing the cascade segment.

BACKGROUND

A cascade reverser is a reverse thrust system typically installed on high bypass ratio turbofan engines. The cascade assembly includes a plurality of cascade segments, or baskets, spaced circumferentially around an engine nacelle. Each cascade segment includes a plurality of spaced air flow turning vanes defining a series of cells or air passages therebetween. When the reverser is in a stowed configuration, the cascade segments are covered and air flows through and rearwardly out of the engine nacelle to provide forward thrust. When the reverser is in a deployed configuration, the cascade segments are uncovered and at least a portion of the air flowing through the engine nacelle is redirected forwardly by the vanes of the cascade segments to provide reverse thrust.

Cascades segments are expensive to manufacture because of complex geometry and high loading, and are typically made of composite materials in order to be more weight efficient. A rapid forming process for the repeating vanes is needed to reduce the manufacturing cost. It has been proposed to combine low cost injection molded vanes with separate composite strongbacks, but the necessity of having a secondary bond combined with a difficult to bond material (i.e., short fiber reinforced thermoplastic) requires a substantial bond area which reduces available air flow area and results in parasitic weight for the bonding flange.

This background discussion is intended to provide information related to the present invention which is not necessarily prior art.

SUMMARY

Embodiments of the present invention address the above-described and other problems by providing a cascade segment for a thrust reverser having a plurality of individual vane elements assembled into repeating modular units, and a method of manufacturing the cascade segment.

In a first embodiment of the present invention, a cascade segment may include a plurality of individual vane elements and first and second modular units. Each individual vane element may include a vane having a first vane end and a second vane end, a first flange extending angularly from the first vane end to a first flange end, and a second flange extending angularly from the second vane end to a second flange end in approximately the same direction as the first flange, such that the individual vane element is generally U-shaped. Each of the first and second flanges may diverge by an amount approximately equal to a thickness of the flange over a desired vane spacing distance, such that when one individual vane element is inserted into another individual element the desired vane spacing distance is established between their respective vanes. The first modular unit may include a first column of the individual vane elements oriented in a first direction, and the second modular unit including a second column of the individual vane elements oriented in a second direction which is opposite the first direction, wherein the first modular unit may be positioned adjacent to the second modular unit in the cascade segment.

Various implementations of the first embodiment may include any one or more of the following features. Each vane of the first modular unit may have a concave cross-section, and each vane of the second modular unit may have a convex cross-section. The first and second flanges may have flat or curved cross-sections. The first flange may have a first flange end and the second flange may have a second flange end, and the first flange ends of the individual vane elements of the of first modular unit may abut the second flange ends of the individual vane elements of the second modular units. The first flange may have a first flange end and the second flange may have a second flange end, and the first and second flange ends may be tapered, and the first flange ends of the individual vane elements of the first modular unit may form scarf joints with the second flange ends of the individual vane elements of the second modular unit. The individual vane elements may be constructed of a thermoplastic material. The cascade segment may further include a plurality of the first modular units and a plurality of the second modular units, wherein the first modular units may be positioned adjacent to and alternating with the second modular units in the cascade segment, and a frame extending at least partly around and securing the pluralities of first and second modular units together.

In a second embodiment, a method of manufacturing a cascade segment may include the following. A plurality of individual vane elements may be formed, with each individual vane element including a vane having a first vane end and a second vane end, a first flange extending angularly from the first vane end to a first flange end, and a second flange extending angularly from the second vane end to a second flange end in approximately the same direction as the first flange, such that the individual vane element is generally U-shaped. Each of the first and second flanges diverge from being perpendicular to the vane by an amount approximately equal to a thickness of the flange over a desired vane spacing distance, such that when one individual vane element is inserted into another individual element the desired vane spacing distance is established between their respective vanes. The plurality of individual vane elements may be assembled to form a first modular unit including a first column of the individual vane elements oriented in a first direction, and a second modular unit including a second column of the individual vane elements oriented in a second direction which is opposite the first direction. The first modular unit may be positioned adjacent to the second modular unit in the cascade segment.

Various implementations of the second embodiment may include any one or more of the following features. Each vane of the first modular unit may have a concave cross-section, and each vane of the second modular unit may have a convex cross-section. The first and second flanges may have flat or curved cross-sections. The first flange may have a first flange end and the second flange may have a second flange end, and the first flange ends of the individual vane elements of the of first modular unit may abut the second flange ends of the individual vane elements of the second modular units. The first flange may have a first flange end and the second flange may have a second flange end, and the first and second flange ends may be tapered, and the first flange ends of the individual vane elements of the first modular unit may form scarf joints with the second flange ends of the individual vane elements of the second modular unit. The individual vane elements may be constructed of a thermoplastic material.

The method may further include assembling the plurality of individual vane elements to form a plurality of the first modular units and a plurality of the second modular units; positioning the first modular units adjacent to and alternating with the second modular units in the cascade segment; and securing the pluralities of first and second modular units together with a frame extending at least partly around the pluralities of first and second modular units.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 1C is an elevation view of an alternative implementation of the individual vane elements;

FIG. 2A is an exploded isometric view of the individual vane element, wherein the vane element is shown configured for a second orientation which is opposite the first orientation, and wherein the vane element is shown cooperating with other vane elements to form a second column within the modular unit;

FIG. 4 is an exploded isometric view of the first and second columns;

FIG. 7 is an exploded isometric view of the cascade segment including an embodiment of a frame component;

FIG. 8 is an isometric view of the cascade segment including the frame component;

FIG. 9 is a fragmentary isometric view of a forward end of the cascade segment shown in a prior stage of construction, with components shown in broken line to indicate removal or movement;

FIG. 10 is a fragmentary isometric view the forward end of the cascade segment of FIG. 9 shown in a subsequent stage of construction;

FIG. 14 is a fragmentary perspective view of a portion of the aft end of the cascade segment of FIG. 13 in a subsequent stage of construction, with components shown in broken line to indicate removal or movement;

FIG. 15 is an elevation view of the aft end of the cascade segment of FIG. 14; and FIG. 16 is an elevation view of a side portion of the cascade segment interacting with the frame component.

Figure 1A:
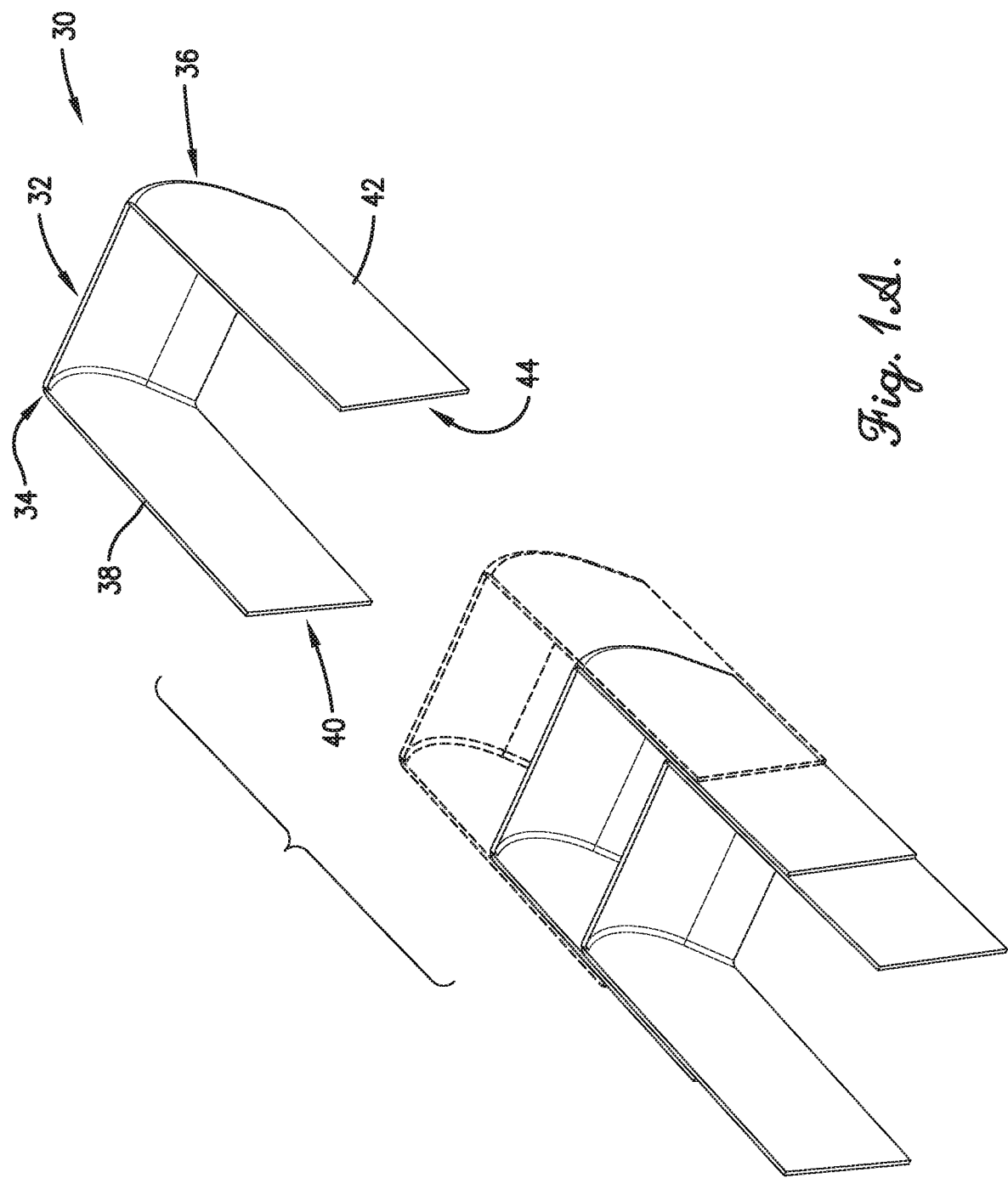
FIG. 1A is an exploded isometric view of an embodiment of an individual vane element, wherein the vane element is shown configured for a first orientation, and wherein the vane element is shown cooperating with other vane elements to form a first column within a modular unit of a cascade segment.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly characterized, the present invention relates to cascade thrust reversers and methods of manufacturing them. More particularly, embodiments provide a cascade segment for a thrust reverser having a plurality of individual vane elements assembled into repeating modular units, and a method of manufacturing the cascade segment. Embodiments advantageously allow for manufacturing cascade segments at lower costs and with lighter weights than prior art manufacturing methods. In particular, the cascade segments may be constructed from reformable thermoplastics which are more erosion resistant, damage tolerant, and tougher than prior art thermosetting cascades, and/or from metals which enable higher temperature applications. Additionally, embodiments may incorporate the flange into the strongback, thereby providing structural continuity from the vanes to the attachments points, and eliminating the parasitic bonding flanges or tie-in plies found in prior art thermosetting cascade segments.

Referring to the figures, an embodiment of a cascade segment incorporating a plurality of individual vane elements, and an embodiment of a method of manufacturing them, may include the following. Referring particularly to FIGS. 1A, 1B, 2A, and 2B, an individual vane element 30 may include a vane 32 having a first end 34 and a second end 36; a first flange 38 extending angularly from the first end 34 of the vane 32 to a first flange end 40; and a second flange 42 extending angularly from the second end 36 of the vane 32 to a second flange end 44 and approximately in the same direction as the first flange 38, such that the element 30 appears to be generally U-shaped (taking into account a divergence amount A, discussed below).

Figure 1B:
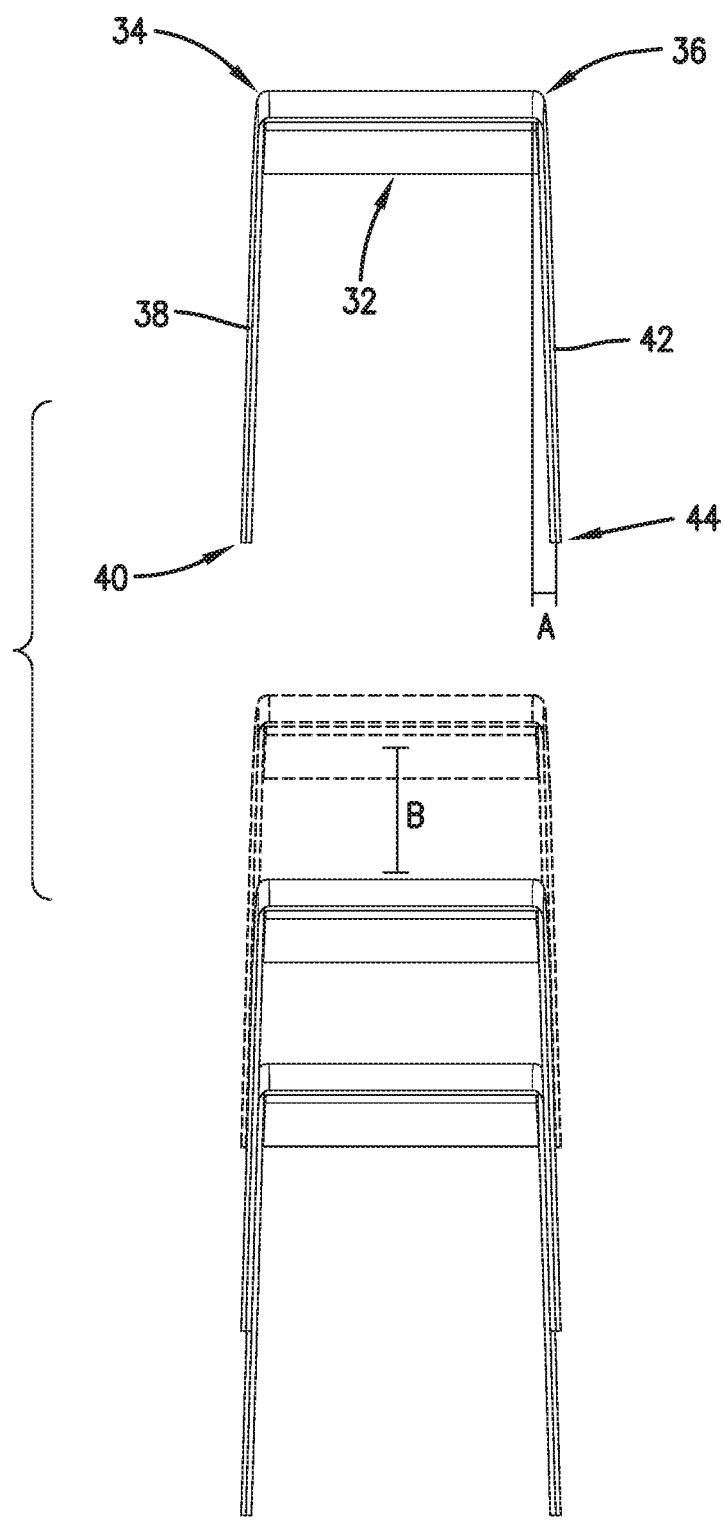
FIG. 1B is an exploded elevation view of the individual vane element and first column of FIG. 1A.
Figure 2B:
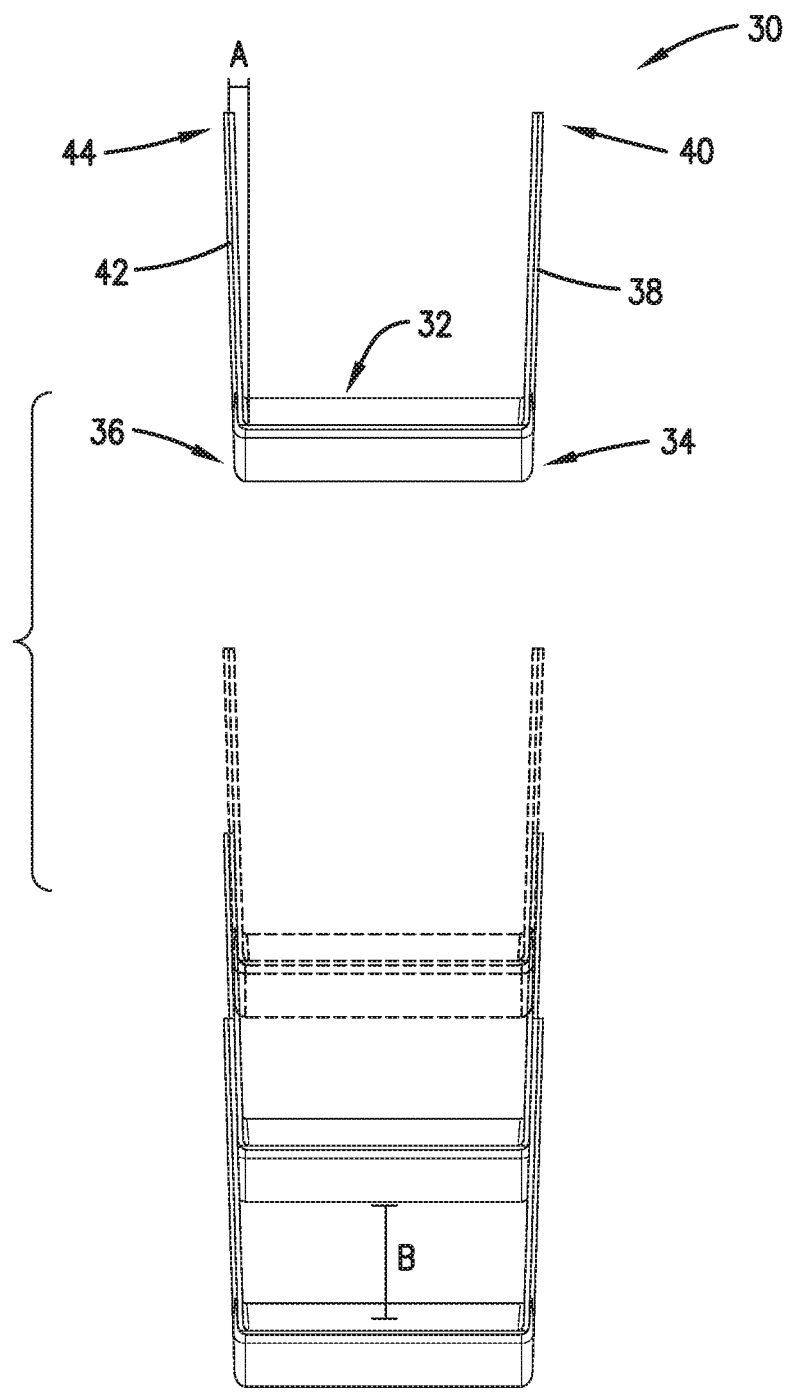
FIG. 2B is an exploded elevation view of the individual vane element and second column of FIG. 2A.

The vane 32 may be curved in order to better accomplish its function of turning an air flow which is exiting the engine nacelle through the cascade segment. As seen in FIGS. 1A and 1B, elements 30 which when assembled into modular units and incorporated into the cascade segment are oriented in a first direction and may have relatively concave vanes, while as seen in FIGS. 2A and 2B, elements 30 which are oriented in an opposite second direction may have relatively convex vanes, such that in the final cascade segment all of the vanes 32 function to turn the air flow in the same forwardly direction.

The first and second flanges 38,42 may be flat or curved depending on whether the cascade segment is to provide only reverse thrust or combined reverse and tangential efflux (a side turning cascade). The flanges 38,42 may diverge by a divergence amount A from being perpendicular to the vane 32, wherein the divergence amount A may be approximately equal to a thickness of the flange over the desired vane spacing distance, so that when one element is inserted into another, a desired spacing amount B between adjacent vanes is established (as seen in, e.g., FIGS. 1A, 1B, 2A, and 2B). For a side-turning cascade, the flanges 38,42 may be curved along their entire length in order to fit overlappingly together in a manner similar to stacked cups.

In an alternative implementation shown in FIG. 1C, the flanges 38,42 may extend generally perpendicularly from the vane 32 and the divergence amount A may be achieved by stepping or "joggling" the flanges 38,42 at one or more points along their lengths. Thus, in one implementation the flanges 38,42 may diverge due to the angle from which they extend from the vane; in another implementation the flanges 38,42 may diverge due to one or more steps along their lengths; and yet another implementation may combine these schemes (i.e., angle and step).

Figure 3A:
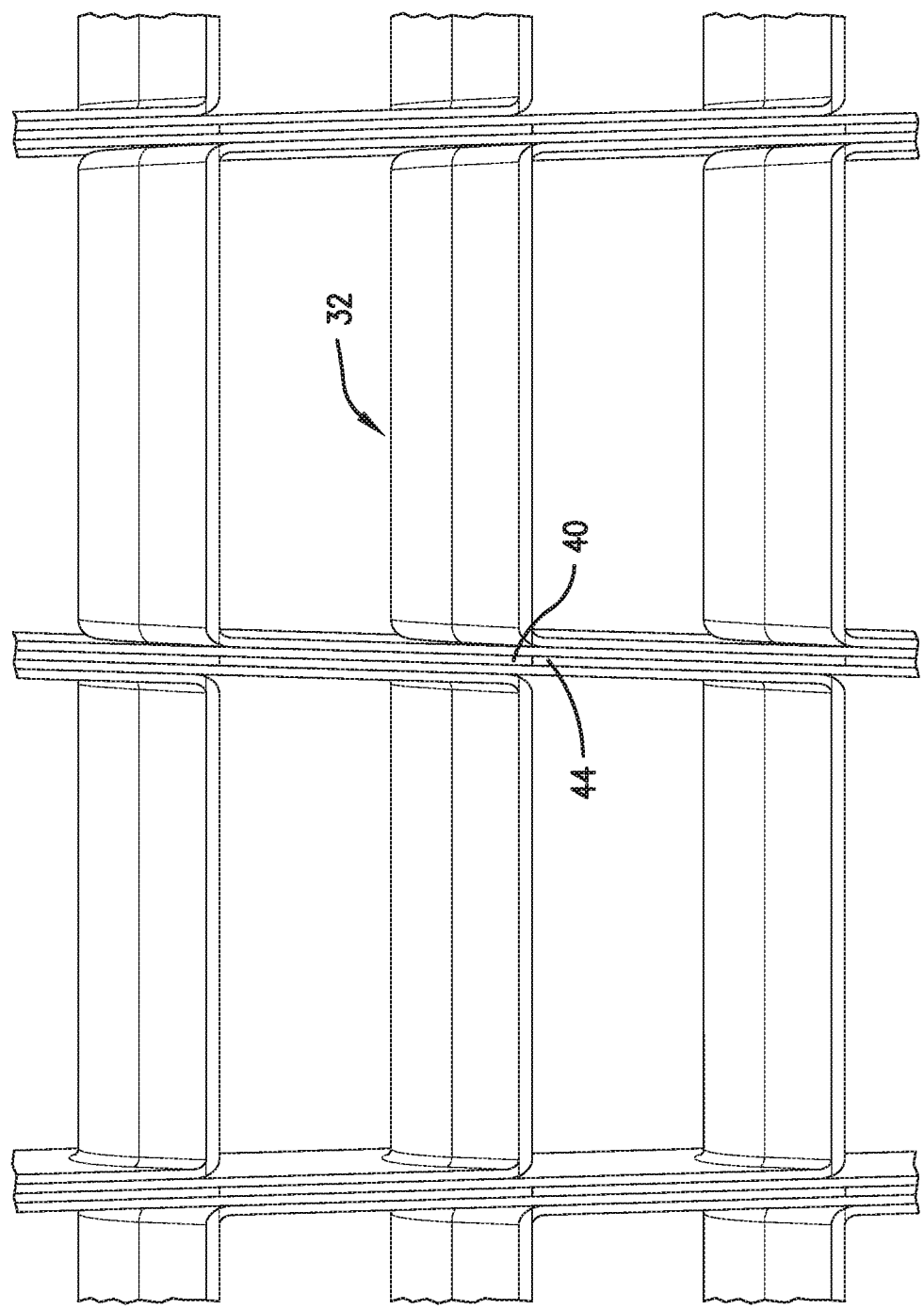
FIG. 3A is a fragmentary perspective view showing the first column in the first orientation and the second column in the second orientation, and a step implementation of flange components of the vane elements.
Figure 3B:
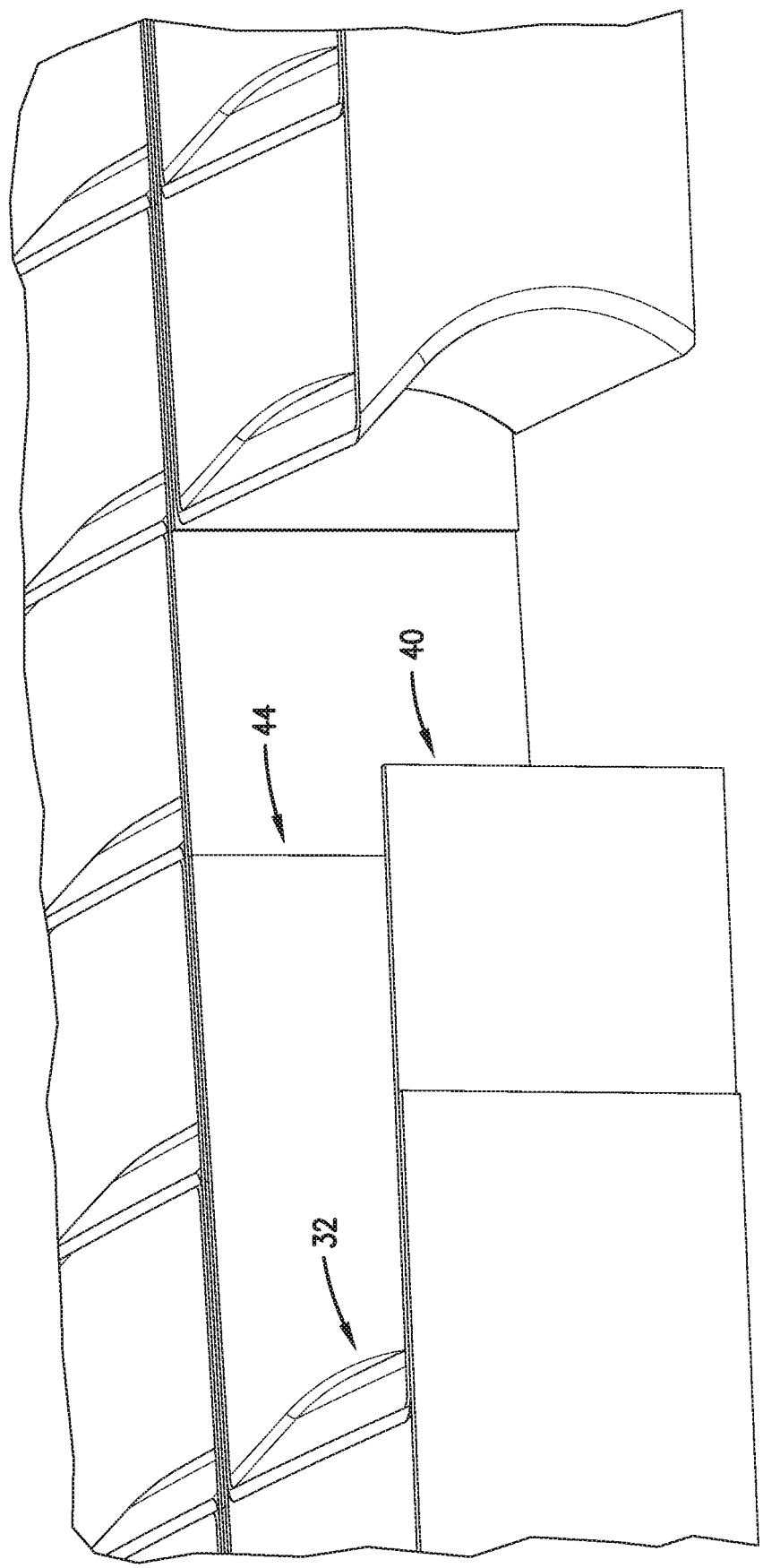
FIG. 3B is fragmentary perspective view of an embodiment of the first and second columns, with a vane component of one of the vane elements hidden for clarity, and a scarf implementation of the flange components of the vane elements.

The ends 40,44 of the flanges 38,42 may be stepped, as seen in FIGS. 1A, 1B, 2A, and 2B. When assembled, the ends of the flanges of elements oriented in the first direction may abut the ends of elements oriented in the second direction, as seen in FIG. 3A, thereby avoiding gaps which might otherwise arise. Alternatively, the ends 40,44 of the flanges 38,42 may be scarfed, i.e., tapered in thickness so that the alternating and interleaved elements overlap to form a scarf joint, as seen in FIG. 3B. In either case, the ends 40,44 of the flanges 38,42 may be configured (e.g., angled or otherwise shaped) or arranged in an alternating or offset manner, as seen in FIG. 4, so that aligned splices at a single station position are avoided when multiple modular units are assembled to form the cascade segment.

Figure 5A:
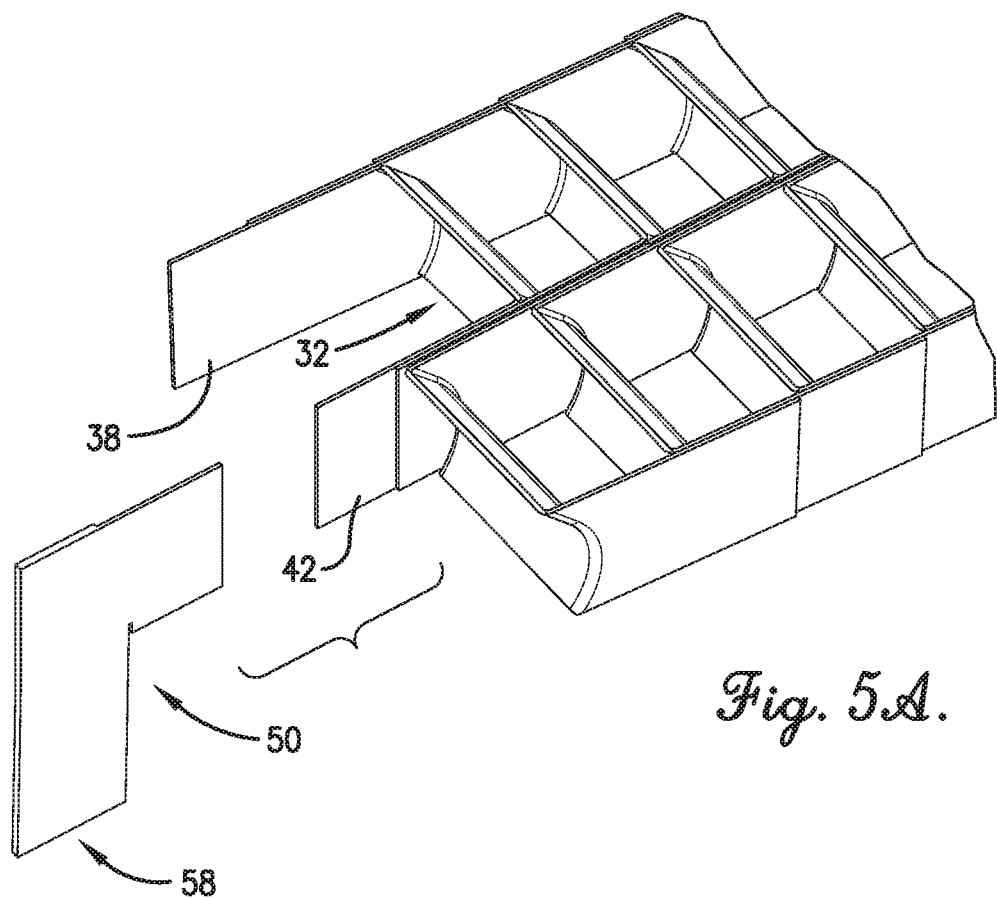
FIG. 5A is an exploded fragmentary isometric view showing a forward filler insert component.
Figure 5B:
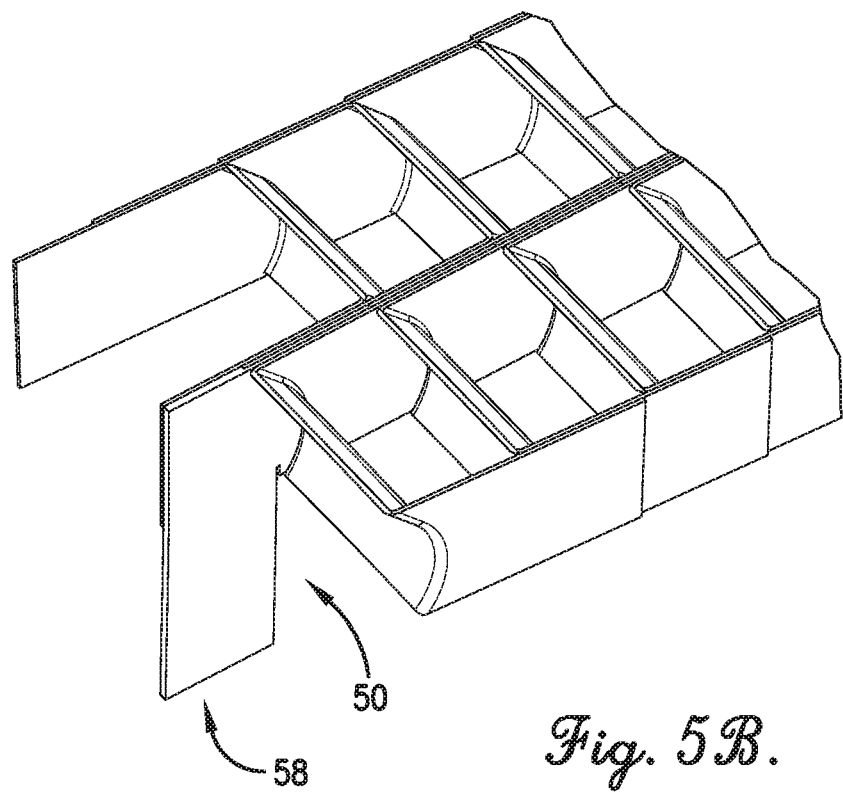
FIG. 5B is a fragmentary isometric view showing the forward filler insert component interacting with the first and second columns.
Figure 6A:
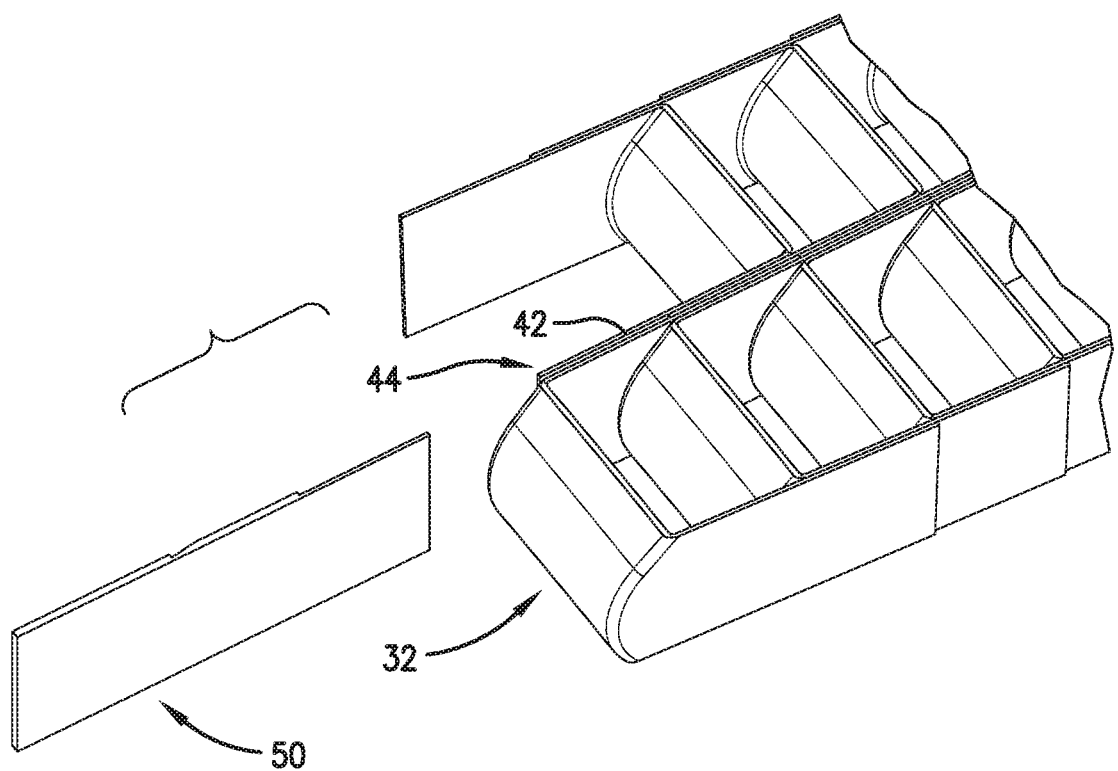
FIG. 6A is an exploded fragmentary isometric view of an aft filler insert component.
Figure 6B:
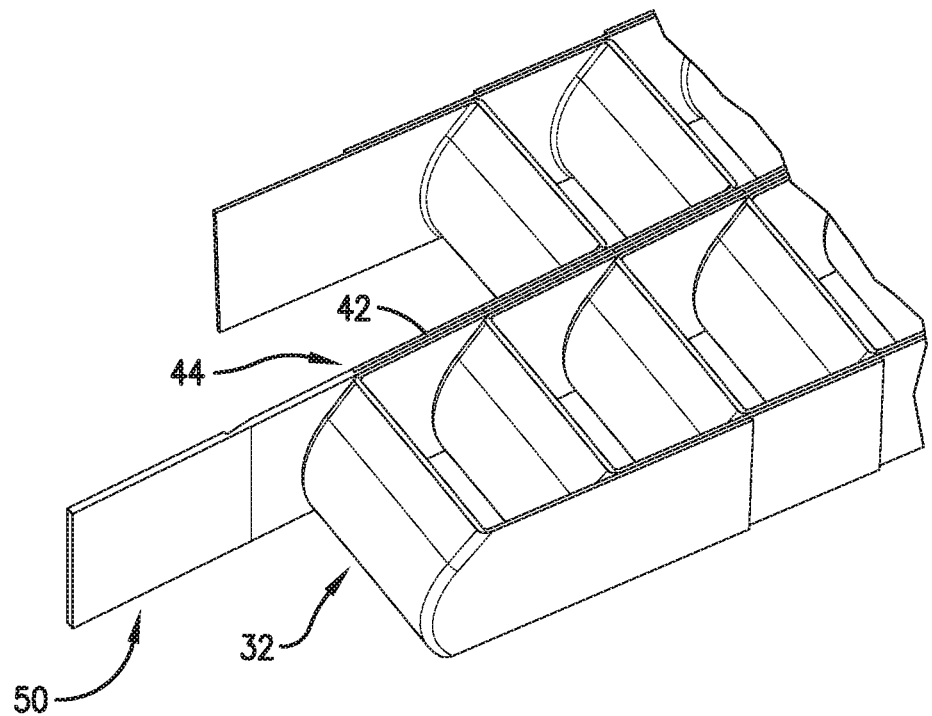
FIG. 6B is a fragmentary isometric view showing the aft filler insert component interacting with the first and second columns.

If the ends 40,44 of the flanges 38,42 are stepped, then at the ends of the modular units, where there is no complementary flange to fill the gap, a filler insert 50 may be inserted between adjacent elements to fill in the gap resulting from the final step. At the forward end of the cascade segment, the filler insert 50 may have a depending leg 58, so as to be substantially L-shaped, as seen in FIGS. 5A and 5B; while at the aft end, the filler insert 50 may not have the depending leg, as seen in FIGS. 6A and 6B. Relatedly, a frame 52, described below, may be positioned around the cascade segment to fill gaps around the periphery and finish the forward and aft ends of the cascade segment.

The elements 30 may be constructed of one or more materials having high specific strengths, which allows the vanes 32 to have thinner cross-sections than would otherwise be required for an injection molded thermoplastic vane or a relatively brittle thermoset composite vane of the prior art. The elements 30 may be constructed of reformable thermoplastics and/or metals, which provide structural continuity from the vanes to the attachment points. A progressive forming process may be used to reduce the initial part/tooling complexity, and subsequent forming operations may be tooled separately, which reduces tooling complexity and assembly tolerances and increases manufacturing rate capacity.

Referring to, e.g., FIGS. 7 and 8, a cascade segment 54 may include a plurality of the individual vane elements 30 assembled into a plurality of modular units 56 in the form of columns of stacked elements 30. More specifically, a plurality of the elements 30 may be stacked to form a column 56 in such a manner that their flanges 38,42 overlap and their vanes 32 are spaced apart by the desired spacing amount B, as seen in FIGS. 1A, 1B, 2A, and 2B, and a plurality of columns 56 may be arranged together so that adjacent columns 56 are oriented in opposite directions, as seen in, e.g., FIG. 8, to form the cascade segment 54.

Figure 11:
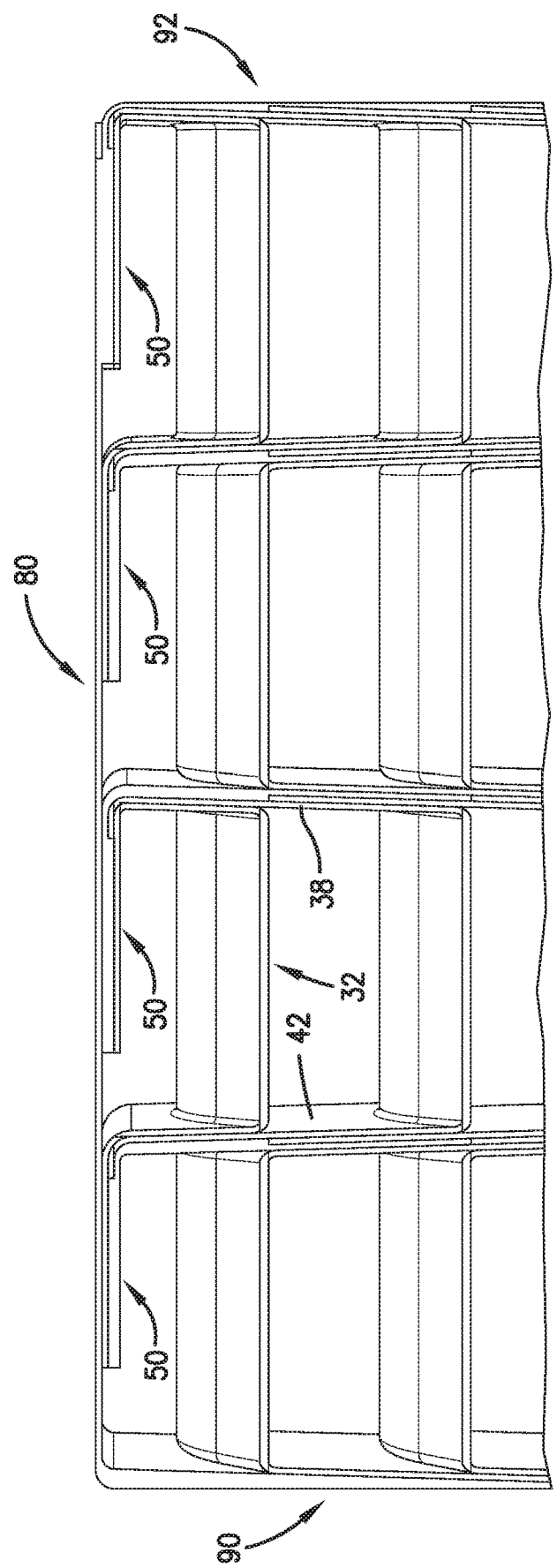
FIG. 11 is a fragmentary elevation view of the forward end of the cascade segment of FIG. 10.

The projecting flanges 38,42 of the final elements 30 at the forward end of every other column 56 (i.e., the columns oriented in the first direction) may be trimmed flush, and the depending portions 58 of the forward filler inserts 50 may be bent so that the depending portions 58 fit into the spaces defined by spacing A in the final cells of each such column 56, as seen in, e.g., FIG. 9. Further, referring again to FIGS. 7 and 8 and to FIGS. 9-11, the forward end of the frame 52 may include a forward flange 70 which finishes the final cells at the forward end of the cascade segment 54. The forward flange 70 may be made integral with the end strongbacks. The forward flange 70 may include a forward filler segment 72 for the one cell which does not receive the depending portion 58 of a filler insert 50, thereby achieving a consistent thickness with the other cells.

Figure 12:
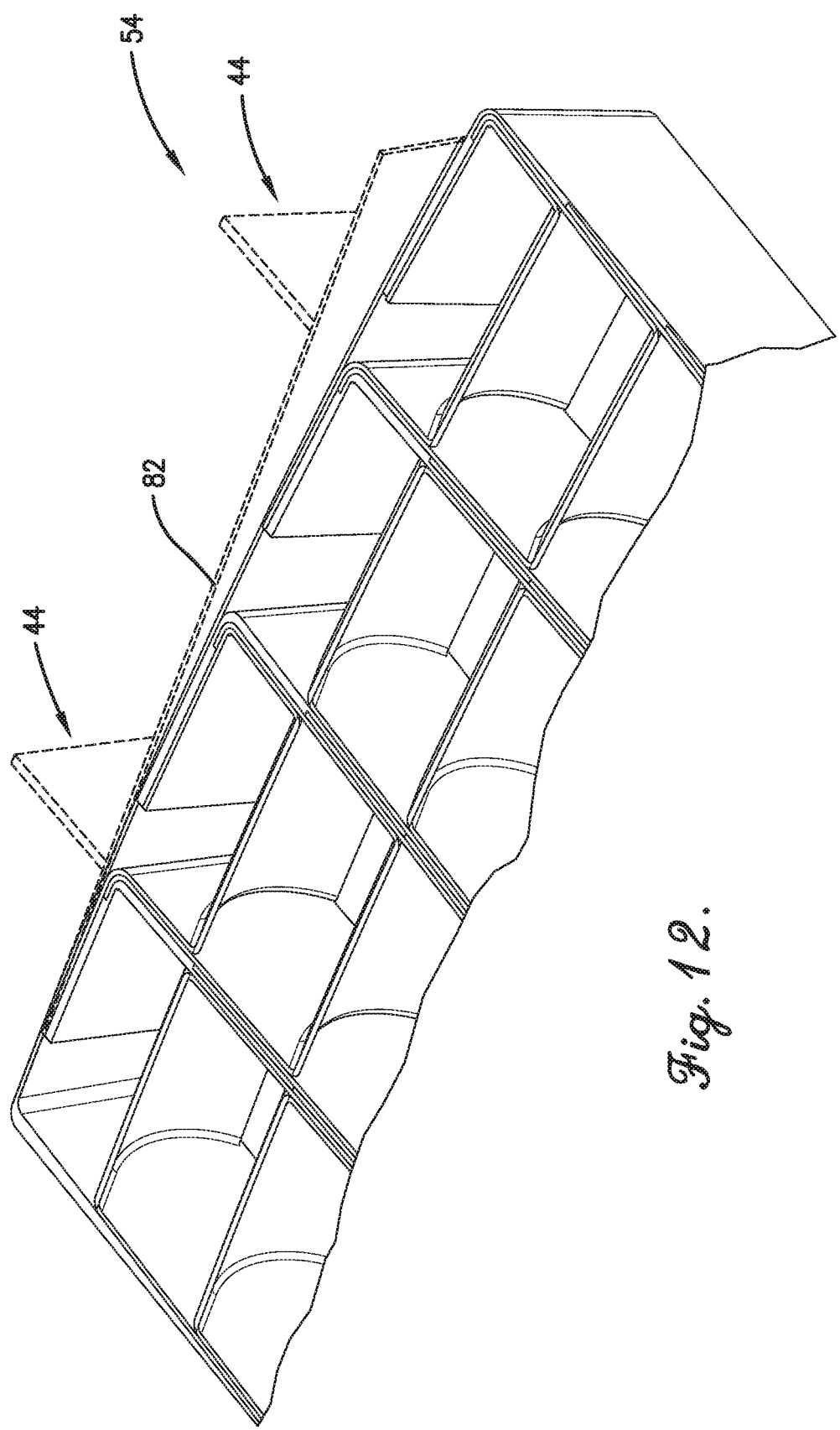
FIG. 12 is a fragmentary isometric view of the aft end of the cascade segment shown in a prior stage of construction, with components shown in broken line to indicate removal or movement.
Figure 13:
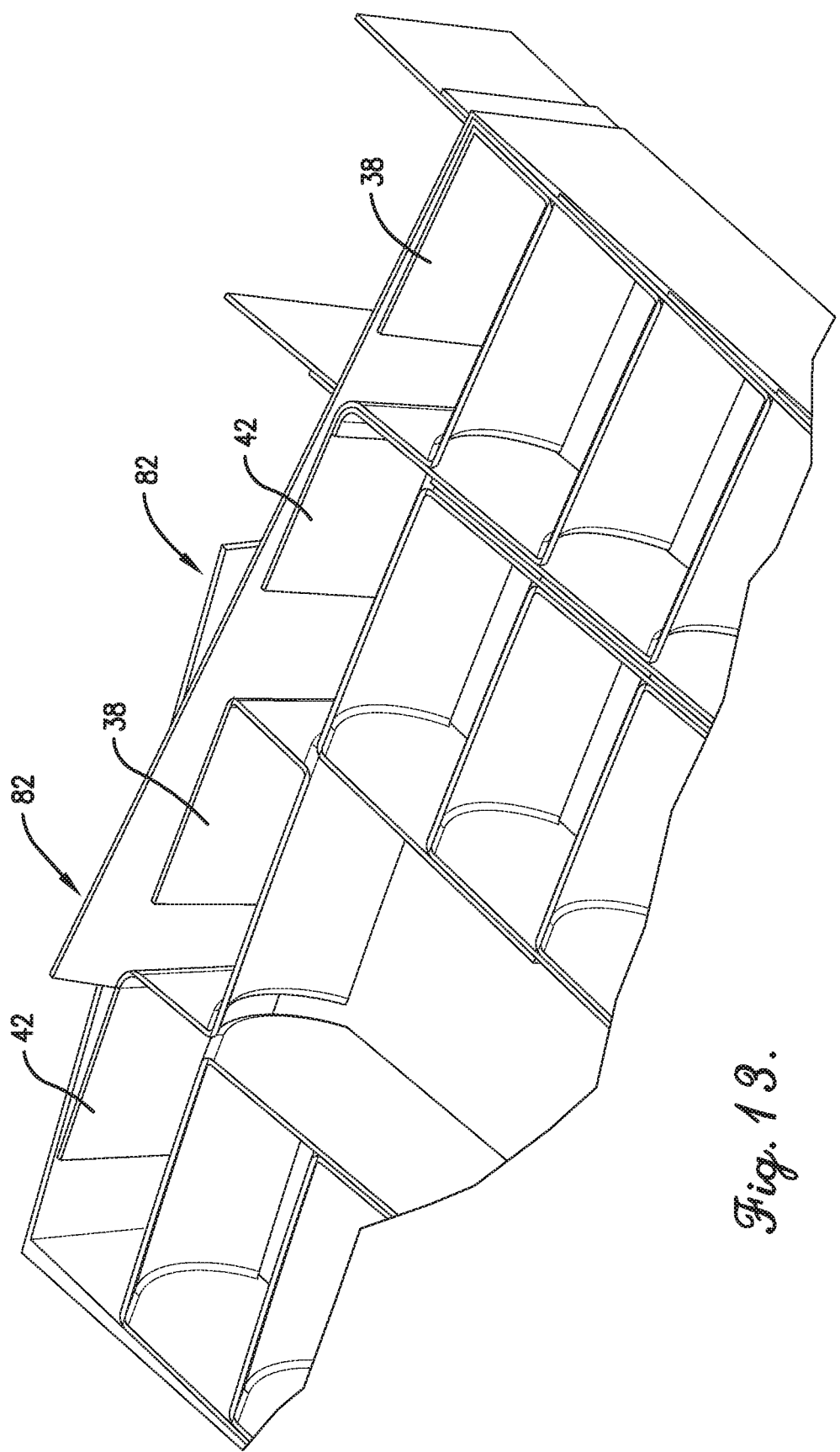
FIG. 13 is a fragmentary perspective view of the aft end of the cascade segment of FIG. 12 shown in a subsequent stage of construction.

The projecting flanges 38,42 of the final elements 30 at the aft end of every other column 56 (i.e., the columns oriented in the second direction) may be bent and utilized for attachment after subsequent forming steps, as seen in, e.g., FIG. 12. Further, referring again FIGS. 7 and 8 and to FIGS. 12-15, the aft end of the frame 52 may include an aft flange 80. The aft flange 80 may close the final cells at the aft end of the cascade segment 54. At the aft end of the cascade segment 54, the ends 40,44 of the first and second flanges 38,42 of the final elements 30 of each column 56 may be bent or folded.

The aft flange 80 may take the form of one or more extension elements 82 which may be positioned across the ends of the columns 56, as seen in FIGS. 12-15 (recalling that the cascade segment 54 may be used in a thrust reverser on an engine nacelle, FIG. 15 shows the curvature that the segment 54 may be given for that particular application). The extension elements 82 may abut or scarf onto the bent ends of the flanges 38,42 of the alternating columns 56. The extension elements 82 may be secondarily formed and provide structural continuity for carrying load from the aerodynamically loaded vanes 32 to attachment fasteners at the ends of the cascade segment 54. The extension elements 82 may be cold-formed or thermoformed, depending on the material used, into attach features either before or after assembly of the columns 56. Additionally, the extension elements 82 may be shaped as desired to enable folding sideways to form an integral circumferential flange, or tangentially for a radial flange. The ends of the cascade segment 54 may then be reinforced with pieces of similar material abutted or scarfed into the steps of the overlapping extension elements 82 to achieve the desired thickness.

Referring again to FIG. 7 and to FIG. 16, the frame 52 may further include first and second sides 90,92, with each side 90,92 having a step structure which complements the steps resulting from the ends 40,44 of the flanges 38,42 in the outer columns 56 and thereby fills the gaps left by these steps about the periphery of the cascade segment 54.

The entire assembly of thermoplastic composite material may then be clamped with a weld line susceptor, a resistive element, a spiked ultrasonic energy director, or other means of heating the faying surfaces, resulting in a fusion weld between the repeating columns 30 and the interleaved elements 32. With a fusion welded assembly, heat may be applied only at the weld locations so that the vane portion need not be constrained from distortion or deconsolidation during the welding process. Additionally, active cooling may be applied to the vane portion as necessary. Alternatively, the faying surfaces may be covered with a brazing foil, flux solution, or cleaned for a resistance weld if the repeating elements are composed of a metallic material such as aluminum, titanium, or steel. The melting temperature of the braze material may be selected to be below the melting point of the vanes so the entire assembly could be heated simultaneously in a furnace.

Although described herein in the context of thrust reverser cascades, other applications for the manufacturing method described herein include manufacturing turning vanes for HVAC ducts, wind tunnels, or other air handling systems.

Although the invention has been described with reference to the one or more embodiments illustrated in the figures, it is understood that equivalents may be employed and substitutions made herein without departing from the scope of the invention as recited in the claims issued in any corresponding utility patents.

Having thus described one or more embodiments of the invention, what is claimed as new and desired to be protected by Letters Patent includes the following:

The invention claimed is:

1. A cascade segment, the cascade segment comprising: a plurality of individual vane elements, with each individual vane element of the plurality of individual vane elements including—
   a vane having a first vane end and a second vane end,
   a first flange extending angularly from the first vane end to a first flange end, and
   a second flange extending angularly from the second vane end to a second flange end in approximately the same direction as the first flange, such that the individual vane element is generally U-shaped,
   wherein each of the first and the second flanges diverge from being perpendicular to the vane by an amount equal to a thickness of the respective first or the respective second flange over a desired vane spacing distance, such that when one of the individual vane elements is inserted into another of the individual vane elements the desired vane spacing distance is established between their respective vanes;
   a first modular unit including a first column of the individual vane elements oriented in a first direction; and
   a second modular unit including a second column of the individual vane elements oriented in a second direction which is opposite the first direction,
   wherein the first modular unit is positioned adjacent to the second modular unit in the cascade segment.

2. The cascade segment of claim 1, wherein each vane of the first modular unit has a concave cross-section, and each vane of the second modular unit has a convex cross-section.

3. The cascade segment of claim 1, wherein the first and the second flanges have flat cross-sections.

4. The cascade segment of claim 1, wherein the first and the second flanges have curved cross-sections.

5. The cascade segment of claim 1, wherein the first flange ends of the individual vane elements of the first modular unit abut the second flange ends of the individual vane elements of the second modular unit.

6. The cascade segment of claim 1, wherein the first and the second flange ends are tapered, and the first flange ends of the individual vane elements of the first modular unit form scarf joints with the second flange ends of the individual vane elements of the second modular unit.

7. The cascade segment of claim 1, wherein the individual vane elements are constructed of a thermoplastic material.

8. The cascade segment of claim 1, wherein the first modular unit is one of a plurality of first modular units;
   wherein the second modular unit is one of a plurality of second modular units,
   wherein the first modular units are positioned adjacent to and alternating with the second modular units in the cascade segment; and
   a frame extending at least partly around and securing the pluralities of the first and the second modular units together.

9. A cascade segment for a thrust reverser, the cascade segment comprising: a plurality of individual vane elements, with each individual vane element of the plurality of individual vane elements including—
   a vane having a first vane end and a second vane end,
   a first flange extending angularly from the first vane end to a first flange end, and
   a second flange extending angularly from the second vane end to a second flange end in approximately the same direction as the first flange, such that the individual vane element is generally U-shaped,
   wherein each of the first and the second flanges diverge from being perpendicular to the vane by an amount equal to a thickness of the respective first or the respective second flange over a desired vane spacing distance, such that when one of the individual vane elements is inserted into another of the individual vane elements the desired vane spacing distance is established between their respective vanes;

a plurality of first modular units, with each first modular unit including a first column of the individual vane elements oriented in a first direction, with each of the vanes having a concave cross-section;

a plurality of second modular units, with each second modular unit including a second column of the individual vane elements oriented in a second direction which is opposite the first direction, with each of the vanes having a convex cross-section;

wherein the first modular units are positioned alternatingly with and adjacent to the second modular units in the cascade segment; and a frame extending at least partly around and securing the pluralities of the first and the second modular units together.

10. The cascade segment of claim 9, wherein the first flange ends of the individual vane elements of the first modular units abut the second flange ends of the individual vane elements the second modular units.

11. The cascade segment of claim 9, wherein the first and the second flange ends are tapered, and the first flange ends of the individual vane elements of the first modular units form scarf joints with the second flange ends of the individual vane elements of the second modular units.

12. The cascade segment of claim 9, wherein the individual vane elements are constructed of a thermoplastic material.

13. A method of manufacturing a cascade segment, the method comprising: forming a plurality of individual vane elements, with each individual vane element of the plurality of individual vane elements including— a vane having a first vane end and a second vane end, a first flange extending angularly from the first vane end to a first flange end, and a second flange extending angularly from the second vane end to a second flange end in approximately the same direction as the first flange, such that the individual vane element is generally U-shaped, wherein each of the first and the second flanges diverge from being perpendicular to the vane by an amount equal to a thickness of the respective first or the respective second flange over a desired vane spacing distance, such that when one of the individual vane elements is inserted into another of the individual vane elements the desired vane spacing distance is established between their respective vanes;

assembling the plurality of individual vane elements to form— a first modular unit including a first column of the individual vane elements oriented in a first direction, and a second modular unit including a second column of the individual vane elements oriented in a second direction which is opposite the first direction; and positioning the first modular unit adjacent to the second modular unit in the cascade segment.

14. The method of claim 13, wherein each vane of the first modular unit has a concave cross-section, and each vane of the second modular unit has a convex cross-section.

15. The method of claim 13, wherein the first and the second flanges have flat cross-sections.

16. The method of claim 13, wherein the first and the second flanges have curved cross-sections.

17. The method of claim 13, wherein the first flange ends of the individual vane elements of the first modular unit abut the second flange ends of the individual vane elements of the second modular unit.

18. The method of claim 13, wherein the first and the second flange ends are tapered, and the first flange ends of the individual vane elements of the first modular unit form scarf joints with the second flange ends of the individual vane elements of the second modular unit.

19. The method of claim 13, wherein the individual vane elements are constructed of a thermoplastic material.

20. The method of claim 13, wherein the first modular unit is one of a plurality of first modular units and wherein the second modular unit is one of a plurality of second modular units, the method further including assembling the plurality of individual vane elements to form— the plurality of the first modular units, and the plurality of the second modular units;

positioning the first modular units alternatingly with and adjacent to the second modular units in the cascade segment; and securing the pluralities of the first and the second modular units together with a frame extending at least partly around the pluralities of the first and the second modular units.

* * * * *